US007873697B2

(12) United States Patent
Goldstein et al.

(10) Patent No.: US 7,873,697 B2
(45) Date of Patent: Jan. 18, 2011

(54) LOCATING AND SHARING GEOSPATIAL INFORMATION IN A PEER-TO-PEER NETWORK

(75) Inventors: Hanoch (Nuke) Goldstein, Burlington, MA (US); Jeffrey Gerard Harrison, Woodbridge, VA (US)

(73) Assignee: Carbon Project, Inc., Woodbridge, VA (US)

( * ) Notice: Subject to any disclaimer, the term of this patent is extended or adjusted under 35 U.S.C. 154(b) by 620 days.

(21) Appl. No.: 11/445,123

(22) Filed: May 31, 2006

(65) Prior Publication Data
US 2007/0180131 A1  Aug. 2, 2007

Related U.S. Application Data (60) Provisional application No. 60/759,856, filed on Jan. 17, 2006.

(51) Int. Cl.
*G06F 15/16* (2006.01)
(52) U.S. Cl. ........................................ 709/207; 709/205
(58) Field of Classification Search ............... 709/207, 709/205
See application file for complete search history.

(56) References Cited

U.S. PATENT DOCUMENTS

| 6,415,227 | B1 | 7/2002 | Lin |
| 6,484,101 | B1 | 11/2002 | Lucus et al. |
| 6,574,655 | B1 | 6/2003 | Libert et al. |
| 6,681,231 | B1 | 1/2004 | Burnett |
| 6,684,219 | B1 | 1/2004 | Shaw et al. |
| 6,704,654 | B2 | 3/2004 | Carroll et al. |
| 6,950,828 | B2 | 9/2005 | Shaw et al. |
| 6,985,929 | B1 | 1/2006 | Wilson et al. |
| 7,107,285 | B2 | 9/2006 | Von Kaenel et al. |
| 2002/0073059 | A1 | 6/2002 | Foster et al. |
| 2003/0088362 | A1 | 5/2003 | Melero et al. |
| 2004/0107196 | A1 | 6/2004 | Chen et al. |
| 2005/0165738 | A1 | 7/2005 | Lancefield |
| 2005/0228803 | A1 | 10/2005 | Farmer et al. |

OTHER PUBLICATIONS

Nuke Goldstein, "Open Geospatial Standards and .NET—A Recipe for Uptake", Directions Magazine, www.directionsmag.com, May 9, 2005, 4 pages.
Nuke Goldstein, "Hands-on on an OGC API", Directions Magazine, www.directionsmag.com, Mar. 11, 2005, 5 pages.

(Continued)

*Primary Examiner*—Jeffrey Pwu
*Assistant Examiner*—Shripal K Khajuria
(74) *Attorney, Agent, or Firm*—Weaver Austin Villeneuve & Sampson LLP (57) ABSTRACT

Methods and apparatus are provided for searching, obtaining, and distributing geospatial information in peer-to-peer networks. A geospatial information application identifies regions of geospatial information available at various peer nodes. The regions may be multidimensional and time varying and are typically associated with associated with information layers and/or components. Regions that overlap with or otherwise correspond to a user requested target region are obtained from peer nodes. The obtained regions may be combined, displayed, marked, and/or stitched to respond to a request. Various content types such as raster or feature based geospatial content from various sources such as files, databases or Web services can be shared within the distributed network.

14 Claims, 6 Drawing Sheets

OTHER PUBLICATIONS

Carbon Project, Inc., "CarbonTools SDK Quick Start", www.carbontools.com, Mar. 2005, 15 pages.

Carbon Project, Inc., "CarbonTools 2 Beta 1 Design Paper", Geospatial.Net Development using CarbonTools workshop in Reston, VA., Apr. 12, 2005, 11 pages.

Carbon Project, Inc., "Carbon Project Supports GSDI with Carbontools Open-Geospatial Toolkit," www.thecarbonproject.com/news/press.html., May 6, 2005, 11 pages.

Website: www.osgeo.org, "Welcome to the Open Source Geospatial Foundation Website", pp. 1-4, downloaded Mar. 1, 2007.

Website: www.osgeo.org, "Mapbender InfoSheet", pp. 1-4, downloaded Mar. 1, 2007.

Website: www.osgeo.org, "MapBuilder Info Sheet", pp. 1-3, downloaded Mar. 1, 2007.

Website: www.osgeo.org, "MapGuide Open Source Project Info Sheet", pp. 1-3, downloaded Mar. 1, 2007.

Website: www.osgeo.org, "MapServer Info Sheet", pp. 1-4, downloaded Mar. 1, 2007.

Website: www.osgeo.org, "OpenLayers Info Sheet", pp. 1-4, downloaded Mar. 1, 2007.

Website: www.osgeo.org, "GRASS Info Sheet", pp. 1-3, downloaded Mar. 1, 2007.

Website: www.osgeo.org, "OSSIM InfoSheet", pp. 1-3, downloaded Mar. 1, 2007.

Website: www.osgeo.org, "GDAL/OGR Info Sheet", pp. 1-3, downloaded Mar. 1, 2007.

Website: www.osgeo.org, "GeoTools InfoSheet", pp. 1-3, downloaded Mar. 1, 2007.

Website: www.osgeo.org, "GeoNetwork opensource Project Info Sheet", pp. 1-4, Mar. 1, 2007.

Website: www.osgeo.org, "OSGeo—Public Geospatial Data Committee", pp. 1-4, downloaded Mar. 1, 2007.

Website: www.osgeo.org, "Education Committee", pp. 1-2, downloaded Mar. 1, 2007.

Website: http://saxta.geog.umd.edu, "Project SAXTA A New, open network dedicated to the sharing of Earth observation data sets", pp. 1, downloaded Mar. 1, 2007.

Website: http://saxta.geog.umd.edu, "Approach—Vision", pp. 1, downloaded Mar. 1, 2007.

Website: http://saxta.geog.umd.edu, "Approach—New Approach to Satellite Data Access", pp. 1, downloaded Mar. 1, 2007.

Website: http://saxta.geog.umd.edu, "Approach—Technology", pp. 1-2, downloaded Mar. 1, 2007.

Website: http://saxta.geog.umd.edu, "Approach—Software Architecture", pp. 1, downloaded Mar. 1, 2007.

http://saxta.geog.umd.edu, "Approach—Development Status", pp. 1, downloaded Mar. 1, 2007.

Website: http://saxta.geog.umd.edu, "Approach—Technology/SAXTA API Specification", pp. 1, downloaded Mar. 1, 2007.

Website: http://saxta.geog.umd.edu, "Overview (SAXTA Javadoc API Documentation)", pp. 1, downloaded Mar. 1, 2007.

Website: http://saxta.geog.umd.edu, "Overview (JXTA Java SE API)", pp. 1-2, downloaded Mar. 1, 2007.

Website: http://saxta.geog.umd.edu, "Overview (Java 2 Platform SE 5.0)", pp. 1-11, downloaded Mar. 1, 2007.

Website: http://saxta.geog.umd.edu, "SAXTA—Download—Software and User's Guide", pp. 1, downloaded Mar. 1, 2007.

Website: http://saxta.geog.umd.edu, "SAXTA—Support—FAQs", pp. 1-3, downloaded Mar. 1, 2007.

PCT, Notification of Transmittal of the International Search Report and the Written Opinion of the International Searching Authority, or The Declaration, Aug. 12, 2008. PCT/US 07/60652.

U.S. Office Action for U.S. Appl. No. 11/114,933 mailed Sep. 7, 2007.

Final Office Action for U.S. Appl. No. 11/114,933 mailed Apr. 1, 2008.

WO International Search Report mailed Jun. 25, 2008 from International Application No. PCT/US06/15498 including Notification of Transmittal; and Written Opinion mailed Jun. 25, 2008.

U.S. Office Action for U.S. Appl. No. 11/114,933 mailed Nov. 5, 2008.

Liping Di., GeoBrain—A Web Services based Geospatial Knowledge Building System, Laboratory for Advance Information Technology and Standards, GMU, Jun. 2004, pages numbered as 1-8.

U.S. Office Action for U.S. Appl. No. 11/114,920 mailed Mar. 25, 2008.

Di, Distributed Geospatial Information Services-Architecures, Standards, and research issues, Laboratory for Advanced Information Technology and Standards, GMU, Jul. 2004.

OpenGIS, OpenGIS Web Services Architecture, Open GIS Consortium Inc. Jan. 18, 2003.

PCT Application No. PCT/US06/15164 Search Report mailed Mar. 21, 2008.

PCT Application No. PCT/US06/15164 Written Opinion mailed Mar. 21, 2008.

Final Office Action for U.S. Appl. No. 11/114,920 mailed Sep. 17, 2008.

U.S. Office Action for U.S. Appl. No. 11/114,920 mailed Apr. 13, 2009.

LOCATING AND SHARING GEOSPATIAL INFORMATION IN A PEER-TO-PEER NETWORK

CROSS-REFERENCE TO RELATED APPLICATIONS

This application claims priority under 35 USC §119(e) from U.S. Provisional Application No. 60/759,856, filed Jan. 17, 2006 and titled "LOCATING AND SHARING GEOSPATIAL INFORMATION IN A PEER-TO-PEER NETWORK," which application is incorporated herein by reference for all purposes.

This application is also related to U.S. patent application Ser. No. 11/114,933, filed Apr. 25, 2005, entitled "METHODS AND APPARATUS FOR ACCESSING GEOSPATIAL INFORMATION", and U.S. patent application Ser. No. 11/114,920, filed Apr. 25, 2005, entitled "METHODS AND APPARATUS FOR ACCESSING GEOSPATIAL INFORMATION", the entirety of which are herein incorporated by reference for all purposes

BACKGROUND OF THE INVENTION

1. Field of the Invention

The present invention generally relates to locating and sharing information in a peer-to-peer network. More specifically, techniques of the present invention provide a method for locating and sharing geospatial content in a distributed computer network.

2. Description of Related Art

Distributed services allow the sharing of information without the need for central data storage. A distributed network includes multiple computer systems that are able to directly exchange information. Specialized software applications running on these systems allow a user of the distributed network to search and share available content. In conventional implementations, the content shared in a distributed network originates from files located on one or more systems in the network. Shared information can include documents, music, movies and other type of information stored as a file or parts of a file on one or more computers. Searching and transporting the information is closely related to the physical presence of a distinct file.

Geospatial information is any data describing the location, characteristics, and/or features of a particular entity. Geospatial information is highly diverse and includes information from disparate sources such as terrain maps, aerial and satellite images, nautical charts, street maps, power grid data, transit route maps, geospatial notes and photographs. Components of geospatial information include addresses, coordinates, and identifiers.

Unlike music or text files, geospatial information can be massive in size and cover a wide geographic area in various resolutions. Web services generate content according to a requested location that may be specified by a region-of-interest and a set of filters and parameters. A Web service responds with an image of a map or information that produces the required view. Occasionally, geospatial information includes non-imagery information such as points, lines and polygons and related information within the generated content. Furthermore, some Web services may update the information based on temporal variables thus producing content affected by current time or real-time events. For example, a service may provide real-time cloud coverage for weather forecasting. The content managed by such a service may span the whole world in various resolutions and may be updated periodically. A client accessing the service specifies an area-of-interest and receives an up-to-date cloud coverage view for the requested region. In addition, geospatial content gathered or generated by the user may reside on local storage and accessed directly by the user's software. The user may utilize different applications to use the geospatial content. Applications such as two-dimensional or three-dimensional viewers are commonly available.

Geospatial content from different locations and services cannot be located and shared the same way as files. Consequently, improved techniques are required for searching, obtaining, and distributing geospatial content and sources in a distributed network.

SUMMARY OF THE INVENTION

Methods and apparatus are provided for searching, obtaining, and distributing geospatial information. A system obtains information on the characteristics of information accessed or accessible by other systems in a distributed network. Examples of characteristics of geospatial information include aggregated location, area, and/or region information. The system analyzes characteristics of geospatial information available at other systems in the distributed network to allow efficient search and acquisition of geospatial information.

In one embodiment, a system finds relevant content available on other systems according to a given location, area or region-of-interest, in world coordinates, selected by the application performing the search. Distributed systems that include regions within the searched area are queried for the content relevant to the searched region. The available content collected from the relevant systems is listed for the system that initiates the search. The data listed can include various geospatial information types such as imagery, maps, geospatial notes, photographs, and geospatial features. Furthermore, data can originate from various sources such as local files, databases, or Web services.

In another embodiment, each system in a distributed network runs a software application that allows the user to use a location, area or region including imagery, maps, geographically or spatially referenced content, and spatial features from varied sources. When queried by other systems, the application indicates that geospatial information associated with the currently used location can be provided. In addition, content previously stored on the system may be shared as well. The shareable content becomes available to the group of systems that constitute the distributed network. Similarly, each application in the network reports its own available regions and can access an aggregated view of regions made available by other systems.

In yet another embodiment, any system in the distributed network can export the locally used or created and available content including geographically referenced notes and digital media such as photographs audio or video and any related services, parameters and styling upon request. When a data layer or multiple data layers are requested by a directly connected application in the peer-to-peer network, the data is then transmitted to the inquiring system.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of packet networks. However, it should be noted that the techniques of the present invention can be applied to different variations and flavors of networks. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a software application is used in a variety of contexts. However, it will be appreciated that multiple applications running on a single computer system can also be used while remaining within the scope of the present invention.

The advancement in computing hardware and software as well as the emergence of technologies such as the Internet are changing the field of Geographic Information Systems (GIS). The movement toward a more distributed and mobile society and the need to utilize and share geospatial information and services has produced an effort by organizations such as the World Wide Web Consortium (W3C) and Open Geospatial Consortium (OGC) to develop a common 'language' that will allow access to and distribution of geospatial information.

Conventionally, most geospatial information is maintained and used on a single Geography Information System (GIS). Alternatively, the information can be accessed and used from a Database or Web service. Consequently, the techniques and mechanism of the present invention provide tools to allow a user to efficiently and effectively access a variety of geospatial information sources available on other systems. According to various embodiments, a software application that runs on a system connected to a distributed network and is able to connect to a group of systems will be able to search and exchange geospatial content in the distributed network.

A distributed or peer-to-peer (P2P) computer network does not rely on a traditional client server architecture but instead uses bandwidth, storage resources, and computing power available from individual nodes. Some P2P networks continue to use a client server architecture for searching. Others use a peer-to-peer architecture for all purposes including searching and sharing. P2P networks have conventionally been used to share discrete files with concrete descriptors. For example, P2P networks have been used to share audio files, video files, software programs, data files, etc. These files have definable descriptors, such as numeric identifiers, song titles, and file names.

In some P2P applications, individual nodes publish descriptors associated with the stored files and data to a variety of entities such as super peers or servers. When a user searches for a file over the P2P network, descriptors such as song titles or file names are entered and nodes having files associated with these descriptors are identified as available for meeting a user request.

Geospatial information, however, is significantly different from information conventionally exchanged on P2P networks. Geospatial information often includes a large amount of information of different types and often can not be easily described. For example, geospatial information can include terrain maps, aerial and satellite images, nautical charts, street maps, power grid data, transit route maps, geospatial notes, and geospatially referenced photographs, sound, video or other media. Components of geospatial information include addresses, coordinates, and identifiers. One aspect of a description of geospatial information may be coordinates of data being viewed or a boundary box outlining data being viewed. In a simple example, a boundary box may be defined by four coordinates (Xmin,Ymin, Xmax,Ymax). Any outline defining a region being accessed is referred to herein as a boundary box. It should be noted that a boundary box does not necessarily have to be box or even two dimensional. The boundary box can be polygonal or curvilinear, and the region bounded may encompass three dimensional data as well as data varying with time.

According of various embodiments, geospatial information may also include different types of information. The different types of geospatial information are referred to herein as layers. In one example, a user may request geospatial information including terrain and fauna information for a particular boundary box. In another example, a user may request power grid data along with sewage line data for a particular boundary box. Using a conventional client server network, a client has the option to download different types of geospatial information from disparate databases and aggregate the information at a local client. The user can then filter or selectively access particular types of data for particular boundary boxes. However, the amount of information downloaded may be substantial. Because of the substantial amount of resources required for distributing geospatial information in traditional client server architectures, accessing and sharing geospatial information lends itself to a P2P architecture.

However, there is often no easy way to obtain select geospatial information on a P2P network. For example, one P2P node may have a relatively complete nautical chart database and select information on the location of oil and gas fields for a particular boundary box. Another P2P node may request nautical chart information for a different boundary box along with information on fault lines. Because of the nature of boundary boxes, it is extremely rare for multiple users to be accessing the exact same boundary box. Furthermore, multiple users will often not be accessing the same type or the same layers of information. Consequently, it is difficult to provide a technique for sharing and distributing geospatial information in a P2P. The techniques and mechanisms of the present invention provide descriptors for geospatial information.

According to various embodiments, individual nodes generate descriptors for various aspects of geospatial information. In one example, the descriptors include fields for describing a boundary box as well as the types of information available at a particular node.

In one embodiment for content searching, the system can find relevant content available on other systems according to a given location or a region of interest, in world coordinates, selected on the application performing the search. Distributed systems that include regions within the searched area are queried for the content relevant to the region. The available content information collected from the relevant systems is listed for the system that initiated the search. The data listed can include various geospatial information types such as imagery or geospatial features. Furthermore, the types of data can originate from sources such as local files, database or Web services. The user can select one or more layers of content to be imported into the application by reading the data directly from the remote system.

In one embodiment for discovery of available data sources, each system in the distributed network runs a software application that allows the user to view a geospatial region including imagery, maps and features from varied sources. When queried by other systems, the application transmits the currently viewed location as the area where content is available from this system. Content that is available locally, as well as from remote services, becomes available for sharing. In addition, previously stored content on the system may be shared as well. These shareable regions become available to the group of systems that constitute the distributed network. Similarly, each application in the network reports its own available regions and can access an aggregated view of regions available by other systems.

In one embodiment for the sharing of geospatial content, any system in the distributed network can export the locally used and available data layers and any related services, parameters and styling upon request. When a data layer or multiple data layers are requested by a different application, the data is then transmitted to the inquiring system.

Figure 1:
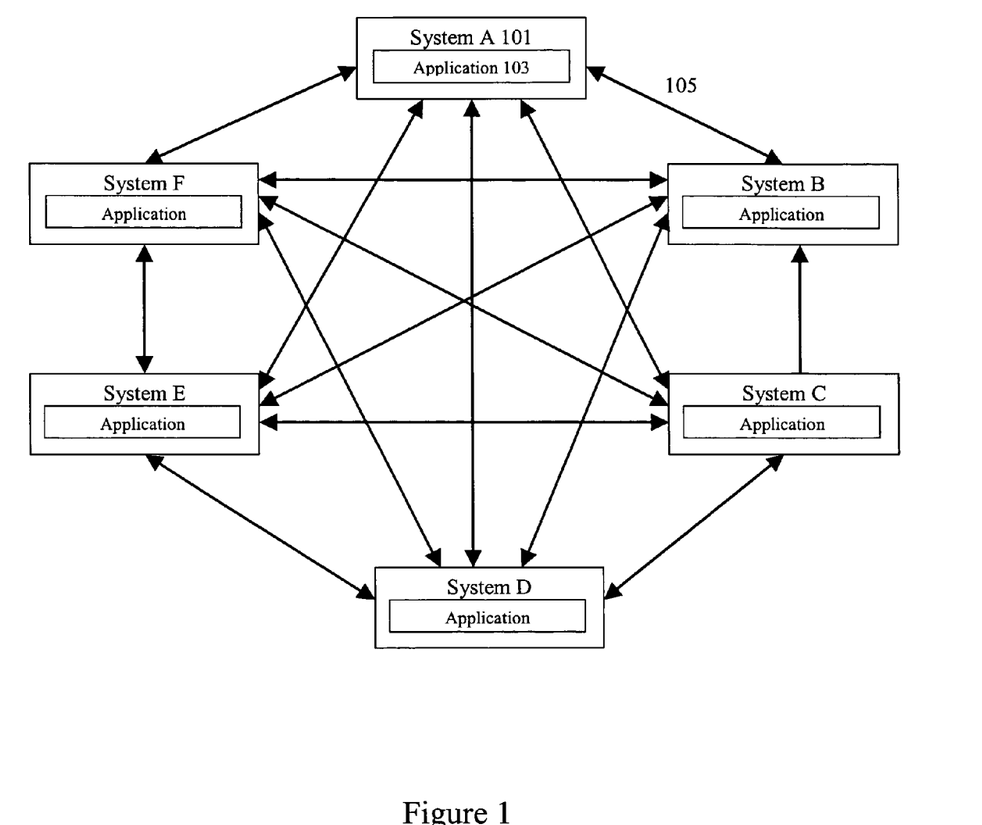
FIG. 1 is a diagrammatic representation of a peer-to-peer network.

FIG. 1 is a diagrammatic representation showing one example of a distributed network that includes a group of six systems. Systems 101, 103, 105, 107, 109, and 111 are connected over network links such as link 105. The systems 101, 103, 105, 107, 109, and 111 run peer-to-peer applications that allow each system to search, access, and distribute content. It should be noted that a variety of intervening nodes may also be present in the network. For example, the systems 101, 103, 105, 107, 109, and 111 may also be connected through one or more routers and switches. In other examples, the systems 101, 103, 105, 107, 109, and 111 may in fact be included in separate subnetworks or possibly subnetworks running different protocols.

Figure 2:
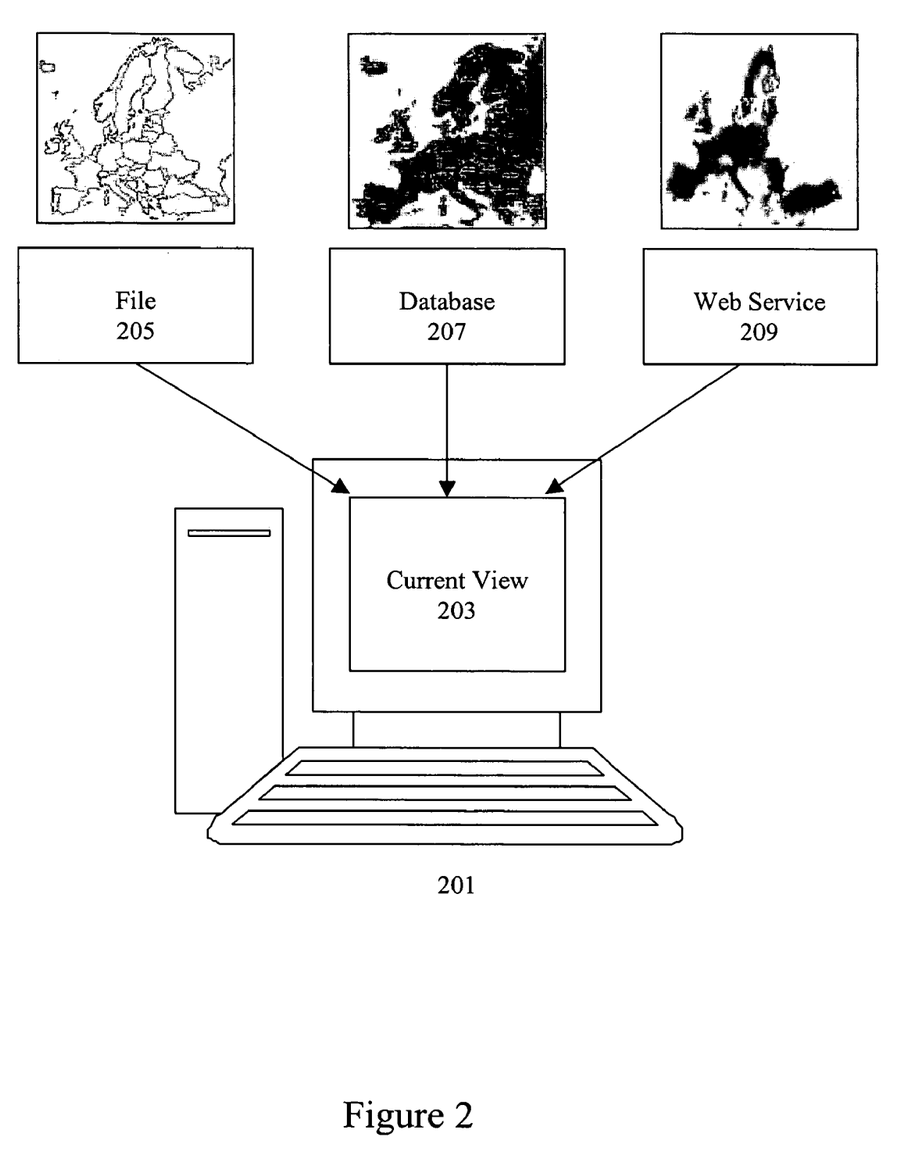
FIG. 2 is a diagrammatic representation showing a computer system running a software application that can connect to various types of geospatial content providers.

FIG. 2 is a diagrammatic representation showing a computer system 201 running a software application 203 that can display various geospatial content types from various sources. According to various embodiments, geospatial content can originate from files 205, storage systems such as databases 207 or from a remote location via a Web service 209. A computer system 201 typically includes a processor as well as one or more input and output interfaces. According to various embodiments, input and output interfaces allow a processor to receive data from network sources, storage devices, user input and output interfaces allow transmission of data to network entities, storage media, displays, and printers. Any device that includes a processor along with one or more input and output interfaces is referred to herein as a computer system. The techniques and mechanisms of the present invention can be implemented in a wide variety of computer system configurations. For instance, instructions and data for implementing the above-described invention may be stored on a disk array or remote network computer.

Figure 3A:
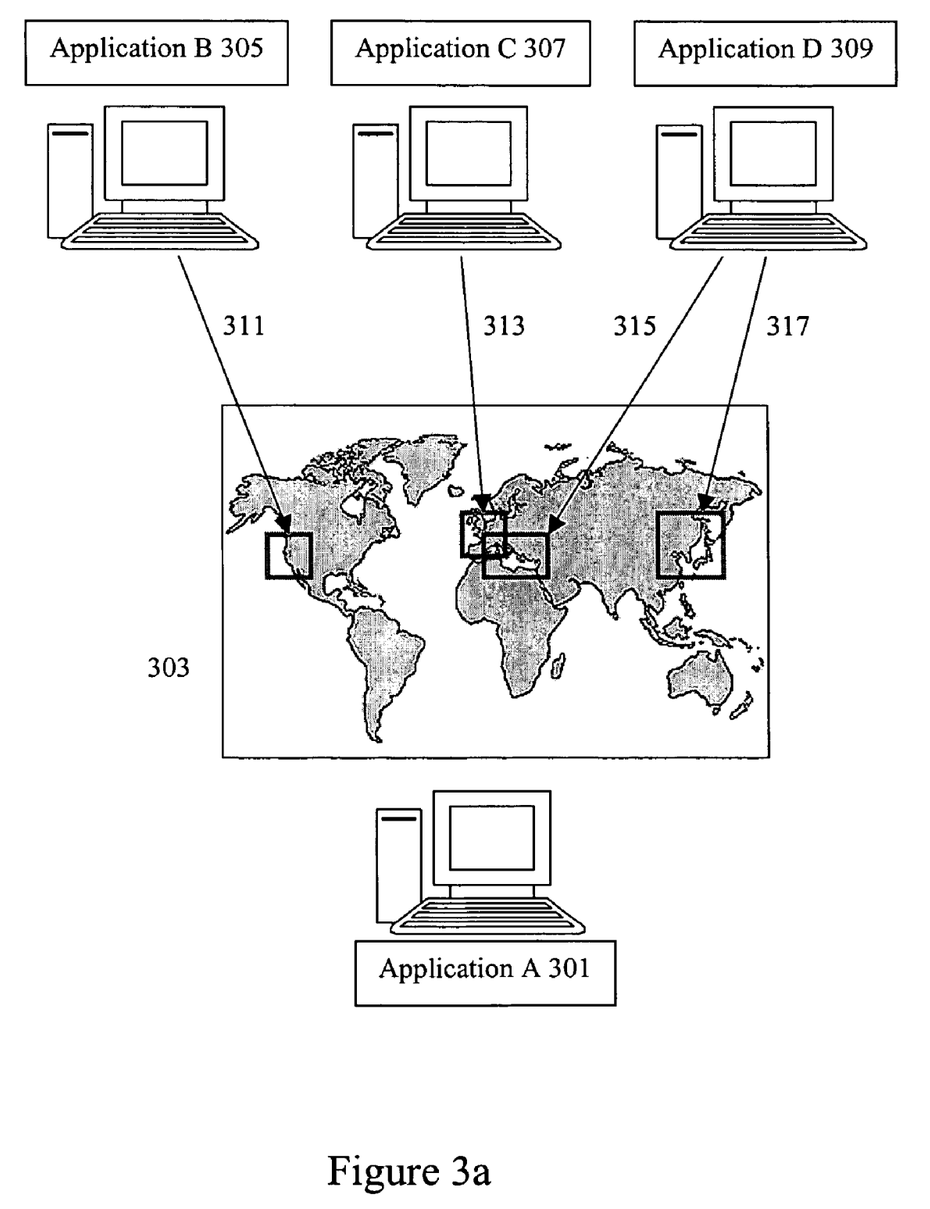
FIG. 3*a* is a diagrammatic representation showing an application assembling an overview of locations, areas or regions available from other applications in a network.

FIG. 3a is a diagrammatic representation showing software application A 301 that can connect to software applications B 305, C 307 and D 309 directly in a peer-to-peer network. According to various embodiments, software application A 301 can display a map 303 and all available regions of content by the other applications in the group. Application B, for example, reports a single region available 311, application B reports a different single available region 313, and application D reports two available regions 315, 317. The aggregated view of the available regions is produced by application A 301 on the map 303.

Available regions reported by applications can originate from either a currently used and viewed region where one or more layers of data are used or from a previously used content that was packaged and stored locally. According to various embodiments, the regions available are reported to other peer nodes, super peer nodes, or even servers. In one particular example, regions available can be reported by using descriptors that include region and geospatial information type information. Any data structure used to report region and geospatial information type or layer information to peer nodes is referred to herein as a geospatial information descriptor.

Figure 3B:
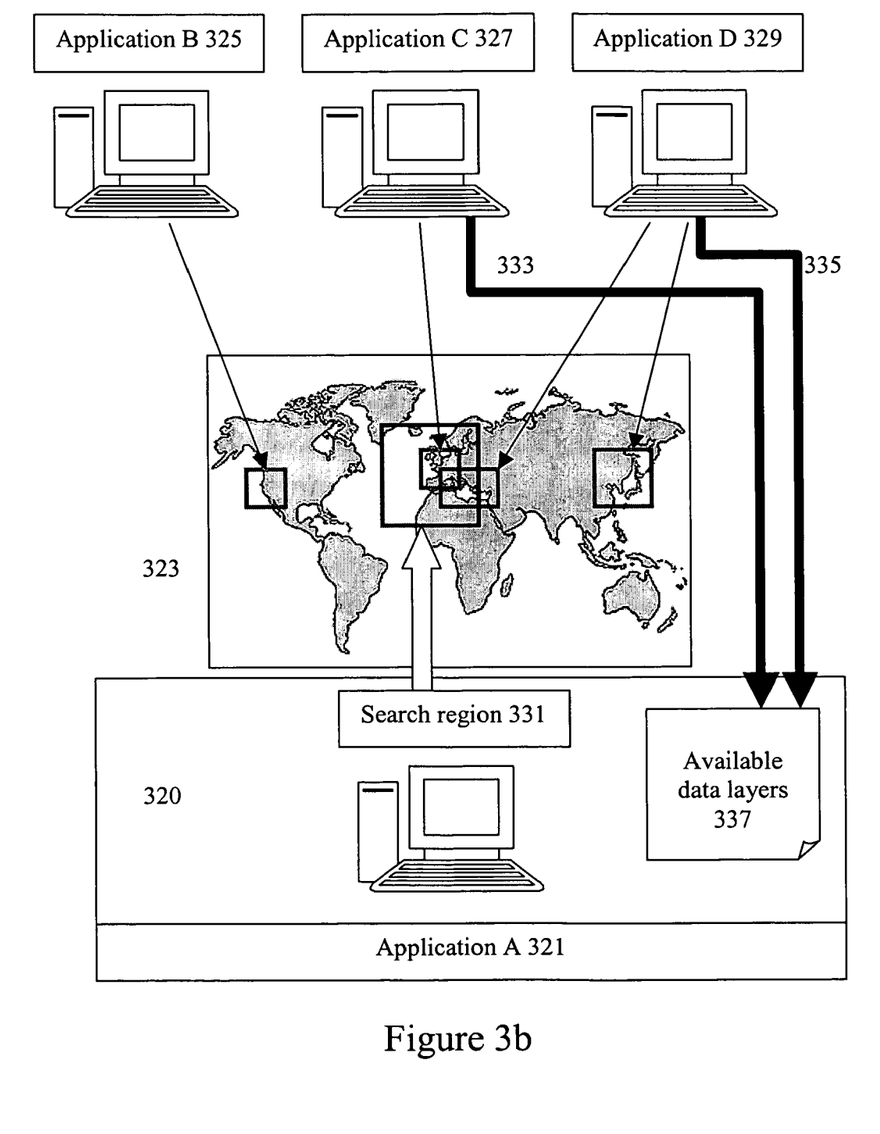
FIG. 3*b* is a diagrammatic representation showing an application requesting a search on a location, area or region-of-interest where content is available from other applications in the network.

FIG. 3b is a diagrammatic representation showing a system 320 in a distributed network running a software application A 321 that can connect to software applications B 325, C 327 and D 329 in a peer-to-peer network. According to various embodiments, software application A 321 displays a map 323 and all available regions of content by the other applications in the group. In some embodiments, application A defines a region-of-interest or a target region for searching geospatial content in a search region 331. According to the defined search region 331, only two systems include relevant information: the system that runs application C 327 and the system that runs application D 329. Application C 327 and application D 329 may have geospatial information that overlaps with or otherwise corresponds to the target region. According to various embodiments, a list of content that matches the search area is transmitted from Application C 327 and from application D 329, as represented by communication lines or data links 333 and 335, respectively. In other embodiments, full or partial data layers associated with the regions are transmitted. Application A 321 can assemble a list of data layers 337 that is relevant to the requested search region. This list can be used to select one or several layers to be read into application A 321.

In another example, application A 321 automatically obtains geospatial information from application C 327 and application D 329. Application A 321 can stitch, combine, filter, store, and/or list, etc. relevant regions of geospatial information obtained from application C 327 and application D 329. The techniques of the present invention contemplate a wide variety of criteria for selecting and providing geospatial data from peer nodes. A user of application A 321 may or may not be aware that Application A 321 is automatically gathering geospatial information from peer nodes and combining regions for display to the user.

Figure 4A:
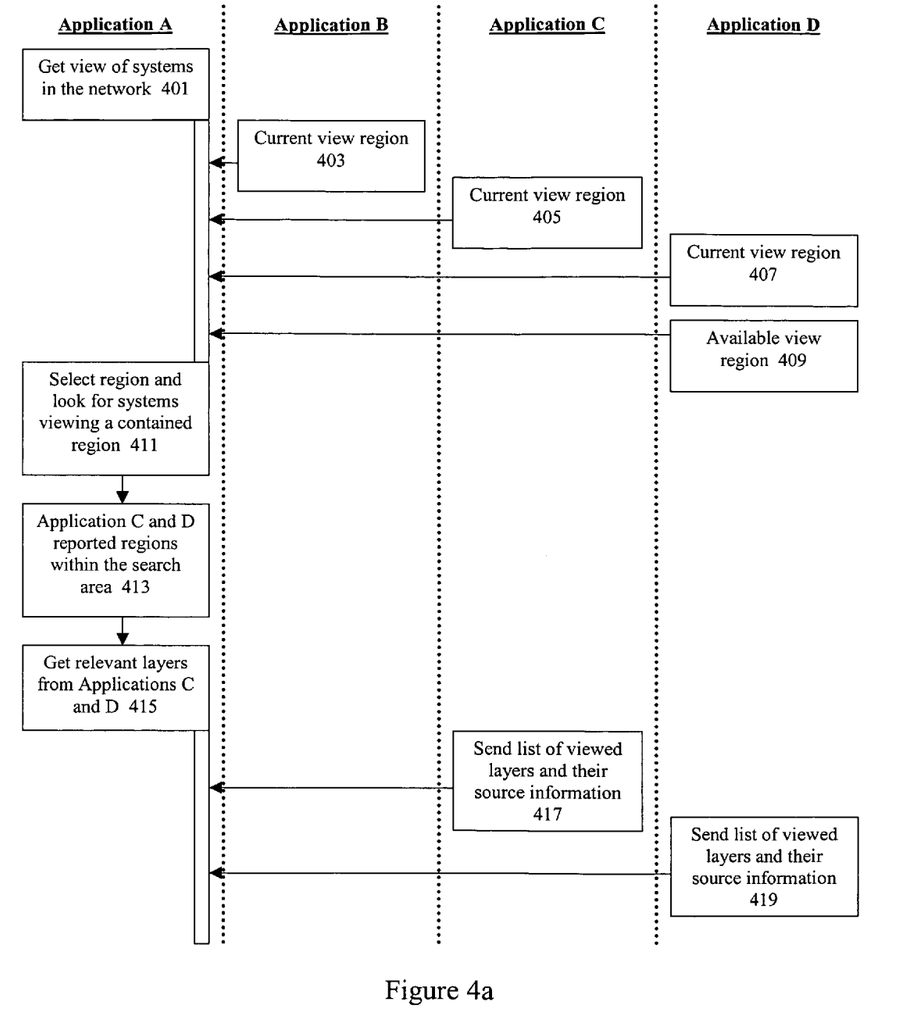
FIG. 4*a* is a flow process diagram showing a technique for an application in a distributed network to get an overview of available content and request a list of content available from the relevant region.

FIG. 4*a* is a flow process diagram showing a technique for searching and fetching geospatial data in a distributed network. At 401, application A requests a current state of available regions by other applications in the distributed network. At 403, application B responds with a region currently accessed by a user. Similarly, at 405, application C responds with a region currently accessed by a user. Application D responds with two available regions: one is the current region used at 407 and the other is a previously stored view at 409. According to various embodiments, each region is represented in world coordinates and can be positioned according to its relative location on an overview map. At 411, the user selects a search region to find geospatial content. The application correlates between the regions obtained from the various systems and the requested search area. In one example, regions obtained from the various systems may overlap with the requested search area. Overlap may include two dimensional overlap, three dimensional overlap, time based overlap, etc. In some examples, overlap may occur in some layers but not necessarily in others.

In one example, at 413, applications C and D report they have sharable content in regions that are included within the requested search area. Application A, at 415, issues a request from the matching applications to list the available data layers in the search area. Application C, at 417, responds with a list of relevant data layers. Similarly, at 419, application D responds with a list of data layers. Application A now has a list of data layers known to have content relevant to the requested search area. In some instances, application A will stitch overlapping regions received from various systems. Application A can also perform time based combinations for geospatial information such as cloud cover information that is time varying.

Figure 4B:
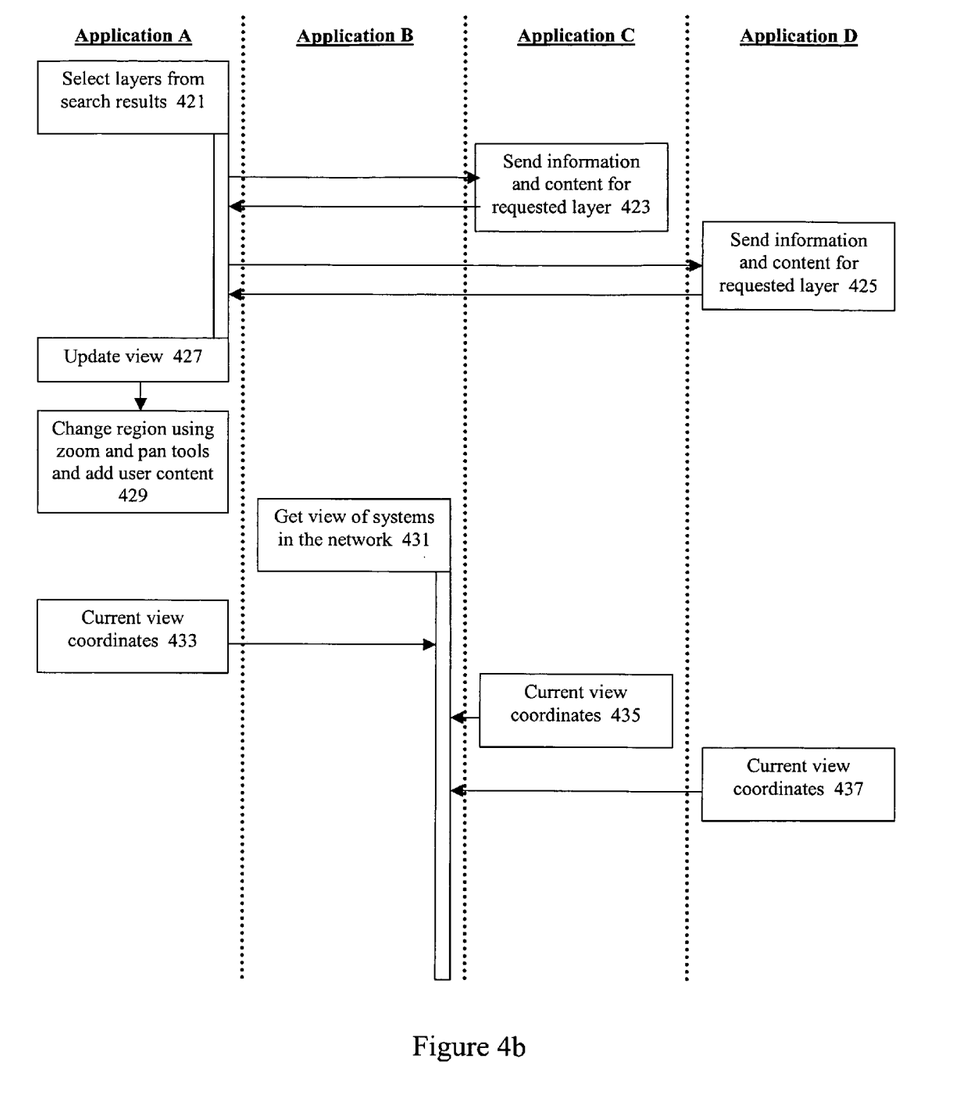
FIG. 4*b* is a flow process diagram showing a technique for an application in a distributed network to read content from other applications and make this content available for searching and sharing by other applications.

FIG. 4*b* is a flow process diagram showing a technique for fetching geospatial data and making it available to the other systems in the distributed network. At 421, application A chooses specific data layers to read. At 423, one or more layers are read from application C and at 425, one or more layers are read from application D. Once the layers are read, the user of application A will have a new view, at 427, that includes the newly-added content. In this example, the user, at 429, has the ability to change the viewed region-of-interest by panning or zooming the view and can add location information and content. Using map zoom and pan tools, the user can change the region looked-at in application A. Any content from a dynamic source, such as Web service, will be updated accordingly. According to various embodiments, this new region is reported upon request from other applications in the distributed network. The information can be reported using geospatial information descriptors. For example, at 431, application B may require a fresh view of available content. Applications A, C, and D will provide any regions available for content sharing at 433, 435, and 437, respectively.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. Accordingly, the present embodiments are to be considered as illustrative and not restrictive, and the invention is not to be limited to the details given herein, but may be modified within the scope and equivalents of the appended claims.

What is claimed is:

1. A method for accessing geospatial information in a peer-to-peer (P2P) network, the method comprising:

receiving a request for a target region of geospatial information at a local peer node connected to the P2P network, the local peer node implemented using a computer system running a peer-to-peer application that allows sharing of geospatial information with a plurality of peer nodes in the P2P network, wherein the request for the target region is associated with a plurality of layers;

identifying the plurality of peer nodes in the P2P network having access to geospatial information, wherein the plurality of peer nodes are implemented using a plurality of computer systems running peer-to-peer applications;

receiving geospatial information descriptors from the plurality of peer nodes at the local peer node;

determining from the geospatial information descriptors that a first region of geospatial information accessible by a first peer node of the plurality of peer nodes at least partially overlaps the target region of geospatial information;

obtaining the first region of geospatial information from the first peer node;

determining from the geospatial information descriptors that a second region of geospatial information accessible by a second peer node of the plurality of peer nodes at least partially overlaps the target region of geospatial information;

obtaining the second region of geospatial information from the second peer node; and combining the first region of geospatial information and the second region of geospatial information to respond to the request for the target region of geospatial information, wherein geospatial information includes one or more of the following geospatial information types: geospatial notes, geospatial features, terrain maps, aerial image, satellite images, nautical charts, street maps, power grid data, transit route maps, and photographs.

2. The method of claim 1, wherein the request for the target region is associated with a plurality of layers.

3. The method of claim 2, wherein the plurality of layers are associated with a plurality of geospatial information types.

4. The method of claim 1, further comprising determining a boundary box associated with the target region.

5. The method of claim 1, wherein the first region of geospatial information corresponds to a geospatial information descriptor.

6. The method of claim 5, further comprising determining a geospatial information component associated with the first region accessible by one of the plurality of peer nodes.

7. The method of claim 6, wherein the geospatial information component is an address, coordinate, or identifier.

8. The method of claim 5, wherein the geospatial information descriptor includes boundary box information and a geospatial information type indicator.

9. The method of claim 5, wherein the geospatial information descriptor includes coordinates and geospatial layer information.

10. The method of claim 1, identifying geospatial information available from local resources at the local node.

11. The method of claim 10, providing a plurality of geospatial information descriptors associated with geospatial information available from local resources to the plurality of peer nodes.

12. A computer system for accessing geospatial information in a peer-to-peer (P2P) network, the system comprising:
an input interface operable to receive a request for a target region of geospatial information and geospatial information descriptors from a plurality of peer nodes each running a peer-to-peer application that allows sharing of geospatial information with the plurality of peer nodes in the P2P network,
wherein the request for the target region is associated with a plurality of layers,
wherein the plurality of peer nodes publish the geospatial information descriptors associated with the geospatial information available from the plurality of peer nodes, and
wherein the plurality of peer nodes are implemented using a plurality of computer systems running peer-to-peer applications; and
a processor operable to run the peer-to-peer application, identify the plurality of peer nodes in the P2P network having access to geospatial information, determine from the geospatial information descriptors that a first region of geospatial information accessible by a first peer node at least partially overlaps the target region of geospatial information and that a second region of geospatial information accessible by a second peer node at least partially overlaps the target region of geospatial information,
wherein the first peer node and the second peer node are is-selected from the plurality of peer nodes obtain the first region of geospatial information from the first node and the second region of geospatial information from the second peer node, and combine the first region of geospatial information and the second region of geospatial information to respond to the request for the target region of geospatial information,
wherein geospatial information includes one or more of the following geospatial information types; geospatial notes, geospatial features, terrain maps, aerial image, satellite images, nautical charts, street maps, power grid data, transit route maps, and photographs.

13. An apparatus for accessing geospatial information, the apparatus comprising:
means for receiving a request for a target region of geospatial information at a local peer node connected to a peer-to-peer (P2P) distributed network, the local peer node implemented using a computer system running a peer-to-peer application that allows sharing of geospatial information with a plurality of peer nodes in the P2P network, wherein the request for the target region is associated with a plurality of layers;
means for identifying the plurality of peer nodes in a distributed network having access to geospatial information, wherein the plurality of peer nodes are implemented using a plurality of computer systems running peer-to-peer applications;
means for receiving geospatial information descriptors from the plurality of peer nodes at the local peer node;
means for determining from the geospatial information descriptors that a first region of geospatial information accessible by a first peer node of the plurality of peer nodes at least partially overlaps the target region of geospatial information;
means for obtaining the first region of geospatial information from the first peer node;
means for determining from the geospatial information descriptors that a second region of geospatial information accessible by a second peer node of the plurality of peer nodes at least partially overlaps the target region of geospatial information;
means for obtaining the second region of geospatial information from the second peer node; and
means combining the first region of geospatial information and the second region of geospatial information to respond to the request for the target region of geospatial information,
wherein geospatial information includes one or more of the following geospatial information types: geospatial notes, geospatial features, terrain maps, aerial image, satellite images, nautical charts, street maps, power grid data, transit route maps, and photographs.

14. A non-transmitting computer readable medium, comprising:
computer code for receiving a request for a target region of geospatial information at a local peer node connected to a peer-to-peer (P2P) network, the local peer node implemented using a computer system running a peer-to-peer application that allows sharing of geospatial information with a plurality of peer nodes in the P2P network; wherein the request for the target region is associated with a plurality of layers;
computer code for identifying the plurality of peer nodes in the P2P network having access to geospatial information, wherein the plurality of peer nodes are implemented using a plurality of computer system running peer-to-peer applications;
computer code for receiving geospatial information descriptors from the plurality of peer nodes at the local peer node;
computer code for determining from the geospatial information descriptors that a first region of geospatial information accessible by a first peer node of the plurality of peer nodes at least partially overlaps the target region of geospatial information;
computer code for obtaining the first region of geospatial information from the first peer node;
code for determining from the geospatial information descriptors that a second region of geospatial information accessible by a second peer node of the plurality of peer nodes at least partially overlaps the target region of geospatial information;
code for obtaining the second region of geospatial information from the second peer node; and
code combining the first region of geospatial information and the second region of geospatial information to respond to the request for the target region of geospatial information,
wherein geospatial information includes one or more of the following geospatial information types: geospatial notes, geospatial features, terrain maps, aerial image, satellite images, nautical charts, street maps, power grid data, transit route maps, and photographs.

* * * * *